United States Patent
Mellet et al.

(10) Patent No.: US 9,249,841 B2
(45) Date of Patent: Feb. 2, 2016

(54) FLUID SUPPLY FOR ROTATING PISTON

(75) Inventors: Edward W. Mellet, Rochester Hills, MI (US); Daryl A. Wilton, Macomb, MI (US); James M. Hart, Belleville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 211 days.

(21) Appl. No.: 13/546,735

(22) Filed: Jul. 11, 2012

(65) Prior Publication Data

US 2014/0018204 A1  Jan. 16, 2014

(51) Int. Cl.
| F16H 3/44 | (2006.01) |
| F16D 25/06 | (2006.01) |
| F16D 25/0638 | (2006.01) |
| F16H 3/66 | (2006.01) |
| F16H 63/30 | (2006.01) |
| F16H 57/08 | (2006.01) |

(52) U.S. Cl.
CPC ............ *F16D 25/06* (2013.01); *F16D 25/0638* (2013.01); *F16H 3/66* (2013.01); *F16H 63/3026* (2013.01); *F16H 2057/087* (2013.01); *F16H 2200/0078* (2013.01); *F16H 2200/2012* (2013.01); *F16H 2200/2048* (2013.01)

(58) Field of Classification Search
CPC . F16D 25/06; F16D 25/0638; F16H 63/3026; F16H 3/66; F16H 2057/087; F16H 2200/2012; F16H 220/2048; F16H 2200/0078
USPC ......... 475/280, 275, 296, 272, 271, 276, 277, 475/278, 288; 192/85.17
See application file for complete search history.

(56) References Cited

U.S. PATENT DOCUMENTS

| 3,916,729 | A | * | 11/1975 | Herr ................................. 475/60 |
| 6,176,803 | B1 | | 1/2001 | Meyer et al. |
| 6,342,026 | B1 | | 1/2002 | Takagi et al. |
| 6,547,688 | B2 | | 4/2003 | Takagi et al. |

(Continued)

FOREIGN PATENT DOCUMENTS

| CN | 1869474 A | 11/2006 |
| CN | 101036001 A | 9/2007 |

(Continued)

OTHER PUBLICATIONS

Pending U.S. Appl. No. 13/206,862, filed Aug. 10, 2011, by Mellet et al. All pages.

(Continued)

*Primary Examiner* — David J Hlavka

(57) ABSTRACT

A transmission is provided having an input member, an output member, at least four planetary gear sets, coupling members, and torque transmitting devices. Each of the planetary gear sets includes first, second and third members. The torque transmitting devices include clutches and brakes actuatable in combinations of two to establish at least eleven forward gear ratios and one reverse gear ratio. A clutch assembly for use in an automatic transmission is provided that includes an apply piston and a stationary fluid supply member. The apply piston is configured to rotate during at least one gear speed of the automatic transmission. The stationary fluid supply member has portions forming a channel in the stationary fluid supply member and defining an outlet end of the channel. The stationary fluid supply member is configured to supply fluid to the apply piston through the outlet end of the channel.

18 Claims, 4 Drawing Sheets

(56) References Cited

U.S. PATENT DOCUMENTS

| | | | |
|---|---|---|---|
| 6,558,287 B2 | 5/2003 | Hayabuchi et al. | |
| 6,634,980 B1 | 10/2003 | Ziemer | |
| 6,663,528 B1 | 12/2003 | Haka | |
| 6,736,751 B1 | 5/2004 | Usoro et al. | |
| 6,743,139 B1 | 6/2004 | Usoro et al. | |
| 6,743,140 B1 | 6/2004 | Lee et al. | |
| 6,743,142 B1 | 6/2004 | Lee et al. | |
| 6,743,143 B1 | 6/2004 | Usoro et al. | |
| 6,743,144 B1 | 6/2004 | Lee et al. | |
| 6,746,357 B1 | 6/2004 | Usoro et al. | |
| 6,752,736 B1 | 6/2004 | Lee et al. | |
| 6,755,765 B2 | 6/2004 | Usoro et al. | |
| 6,758,784 B2 | 7/2004 | Lee et al. | |
| 6,758,787 B2 | 7/2004 | Usoro et al. | |
| 6,764,424 B1 | 7/2004 | Usoro et al. | |
| 6,764,425 B2 | 7/2004 | Lee et al. | |
| 6,764,426 B2 | 7/2004 | Usoro et al. | |
| 6,767,307 B1 | 7/2004 | Lee et al. | |
| 6,802,795 B2 | 10/2004 | Miyazaki et al. | |
| 6,811,512 B2 | 11/2004 | Usoro et al. | |
| 6,837,823 B2 | 1/2005 | Lee et al. | |
| 6,852,059 B2 | 2/2005 | Lee et al. | |
| 6,960,149 B2 | 11/2005 | Ziemer | |
| 6,984,187 B2 | 1/2006 | Biermann | |
| 6,991,578 B2 | 1/2006 | Ziemer | |
| 7,011,597 B2 | 3/2006 | Haka | |
| 7,014,589 B2 | 3/2006 | Stevenson | |
| 7,018,319 B2 | 3/2006 | Ziemer | |
| 7,101,305 B2 | 9/2006 | Tabata et al. | |
| 7,128,683 B2 * | 10/2006 | Oguri et al. | 475/276 |
| 7,163,484 B2 | 1/2007 | Klemen | |
| 7,318,787 B2 * | 1/2008 | Tabata et al. | 477/3 |
| 7,458,912 B2 * | 12/2008 | Oguri et al. | 475/275 |
| 8,496,558 B2 * | 7/2013 | Wittkopp et al. | 475/276 |
| 2005/0090362 A1 | 4/2005 | Abe et al. | |
| 2006/0019791 A1 | 1/2006 | Baldwin | |
| 2006/0270513 A1 | 11/2006 | Klemen | |
| 2006/0270514 A1 | 11/2006 | Oguri et al. | |
| 2006/0270516 A1 | 11/2006 | Klemen | |
| 2007/0293363 A1 * | 12/2007 | Bauknecht et al. | 475/276 |
| 2009/0139818 A1 * | 6/2009 | Ishikawa et al. | 192/3.29 |
| 2011/0030026 A1 | 2/2011 | Ryu et al. | |
| 2011/0121692 A1 * | 5/2011 | Iwase et al. | 310/67 R |
| 2011/0240430 A1 * | 10/2011 | Iwase et al. | 192/3.29 |

FOREIGN PATENT DOCUMENTS

| | | |
|---|---|---|
| DE | 3521731 A1 | 12/1985 |
| DE | 19500540 A1 | 7/1996 |
| DE | 10254066 A1 | 6/2004 |
| DE | 102004038279 A1 | 2/2006 |
| DE | 69927386 T2 | 6/2006 |

OTHER PUBLICATIONS

Pending U.S. Appl. No. 13/428,825, filed Mar. 23, 2012, by Mellet et al. All pages.

* cited by examiner

| GEAR STATE | GEAR RATIO | RATIO STEP | TORQUE TRANSMITTING ELEMENTS | | | | | | |
|---|---|---|---|---|---|---|---|---|---|
| | | | 34 | 32 | 36 | 38 | 28 | 26 | 30 |
| REV | -2.943 | | X | | | | | X | |
| N | | -0.64 | | | | | | | |
| 1ST | 4.584 | | X | | X | | | | |
| 2ND | 2.964 | 1.55 | | X | X | | | | |
| 3RD | 2.413 | 1.23 | | | X | | | | X |
| 4TH | 1.912 | 1.26 | | | X | | | X | |
| 5TH | 1.446 | 1.32 | | | X | | X | | |
| 6TH | 1.000 | 1.45 | | | | | X | X | |
| 7TH | 0.836 | 1.20 | X | | | X | | | |
| 8TH | 0.746 | 1.12 | | X | | | X | | |
| 9TH | 0.599 | 1.25 | | | | X | X | | |
| 10TH | 0.541 | 1.11 | | X | | X | | | |
| 11TH | 0.491 | 1.10 | | | | X | | X | |
| 12TH | 0.440 | 1.12 | | | | X | | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | | | | |
|---|---|---|---|---|---|---|---|---|---|
| | | | 134 | 132 | 136 | 138 | 128 | 126 | 130 |
| REV | -2.943 | | X | | | | | X | |
| N | | -0.64 | | | | | | | |
| 1ST | 4.584 | | X | | X | | | | |
| 2ND | 2.964 | 1.55 | | X | X | | | | |
| 3RD | 2.413 | 1.23 | | | X | | | | X |
| 4TH | 1.912 | 1.26 | | | X | | | X | |
| 5TH | 1.446 | 1.32 | | | X | | X | | |
| 6TH | 1.000 | 1.45 | | | | | X | X | |
| 7TH | 0.902 | 1.11 | X | | | X | | | |
| 8TH | 0.746 | 1.21 | | X | | | X | | |
| 9TH | 0.632 | 1.18 | | | | X | X | | |
| 10TH | 0.583 | 1.08 | | X | | X | | | |
| 11TH | 0.526 | 1.11 | | | | X | | X | |
| 12TH | 0.475 | 1.11 | | | | X | | | X |

X = ON - ENGAGED CARRYING TORQUE
O = ON - ENGAGED NOT CARRYING TORQUE

FLUID SUPPLY FOR ROTATING PISTON

FIELD

The invention relates generally to a clutch of a multiple speed transmission, and more particularly, to a clutch of a transmission having a rotating piston and a stationary fluid supply line.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant.

Traditionally, to transfer oil to rotating clutches within a transmission, oil is fed to the rotating clutches via a rotating central member of the transmission. Centrifugal forces cause the oil to flow from the center of the transmission outward to the rotating clutches. To balance the oil flowing from the center of the transmission, a balance supply of oil is also directed to the clutches from an opposite side of the clutch, which also originates from the transmission central axis. Rotating clutches have used balance dams and shaft seals for oil transfer thereto. Speed changes affect the oil supply because it comes from rotating elements, which rotate at different speeds. For certain clutches, however, a more precise and steady flow of oil may be desired.

Accordingly, there is a need for an improved, cost-effective, compact multiple speed transmission, and in particular, a transmission that provides oil to a rotating clutch in a controlled manner.

SUMMARY

The present disclosure provides a clutch assembly for an automatic transmission having a fluid supply line located outside of the apply piston diameter. In one form, the fluid supply line provides a steady flow of fluid to the piston independent of the output speed. A transmission is provided having an input member, an output member, at least four planetary gear sets, a plurality of coupling members and a plurality of torque transmitting devices. Each of the planetary gear sets includes first, second and third members. The torque transmitting devices may be, for example, clutches and brakes.

In one variation, which may be combined with or separate from other variations described herein, a clutch assembly for use in an automatic transmission is provided. The clutch assembly includes an apply piston and a stationary fluid supply member. The apply piston is configured to rotate during at least one output gear speed of the automatic transmission. The stationary fluid supply member has portions forming a channel in the stationary fluid supply member and defining an outlet end of the channel. The stationary fluid supply member is configured to supply fluid to the apply piston through the outlet end of the channel. At least one member seal contacts the stationary fluid supply member. The member seal is disposed between the stationary fluid supply member and the apply piston.

In another variation, which may be combined with or separate from the other variations described herein, a transmission is provided that includes an input member, an output member, first, second, third, and fourth planetary gear sets each having first, second, and third members, and at least five interconnecting members. A first interconnecting member continuously interconnects the third member of the first planetary gear set with the third member of the fourth planetary gear set. A second interconnecting member continuously interconnects the second member of the first planetary gear set with the third member of the third planetary gear set. A third interconnecting member continuously interconnects the first member of the first planetary gear set with the second member of the second planetary gear set. A fourth interconnecting member continuously interconnects the third member of the second planetary gear set with the second member of the third planetary gear set. A fifth interconnecting member continuously interconnects the first member of the second planetary gear set with the second member of the fourth planetary gear set. The transmission also includes seven torque transmitting mechanisms each selectively engageable to interconnect at least one of the first, second, and third members with at least one other of the first, second, third members and a stationary transmission member. The seven torque transmitting mechanisms are selectively engageable in combinations of at least two to establish at least eleven forward speed ratios and at least one reverse speed ratio between the input member and the output member. At least one of the torque transmitting mechanisms has an apply piston configured to rotate during at least one output gear speed of the transmission. The stationary fluid supply member has portions forming a channel in the stationary fluid supply member and defining an outlet end of the channel. The stationary fluid supply member is configured to supply fluid to the apply piston through the outlet end of the channel.

In yet another variation, which may be combined with or separate from the other variations described herein, a clutch assembly for use in an automatic transmission is provided. The clutch assembly includes an apply piston having an outer side. The apply piston is configured to rotate during at least one output gear speed of the automatic transmission. The clutch assembly also includes a stationary fluid supply member having portions forming a channel in the stationary fluid supply member and defining an outlet end of the channel. The stationary fluid supply member is configured to supply fluid to the apply piston through the outlet end of the channel. At least a portion of the outlet end of the channel is disposed radially outwardly from the outer side of the apply piston.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In some forms of the present disclosure, an eleven or twelve speed transmission is provided in a relatively small package by achieving eleven or twelve forward speeds with four planetary gear sets, four brakes, and three clutches. In other variations, however, additional brakes, clutches, planetary gear sets, or other components may be added.

At the outset, it should be appreciated that the embodiments of the eleven or twelve speed automatic transmissions of the present invention have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

In one embodiment, a first component or element of a first planetary gear set is permanently coupled to a second component or element of a second planetary gear set. A second component or element of the first planetary gear set is permanently coupled to a third component or element of a third planetary gear set. A third component or element of the first planetary gear set is permanently coupled to a third component or element of a fourth planetary gear set. A third component or element of the second planetary gear set is permanently coupled to a second component or element of the third planetary gear set. A first component or element of the second planetary gear set is permanently coupled to a second component or element of the fourth planetary gear set.

Figure 1:
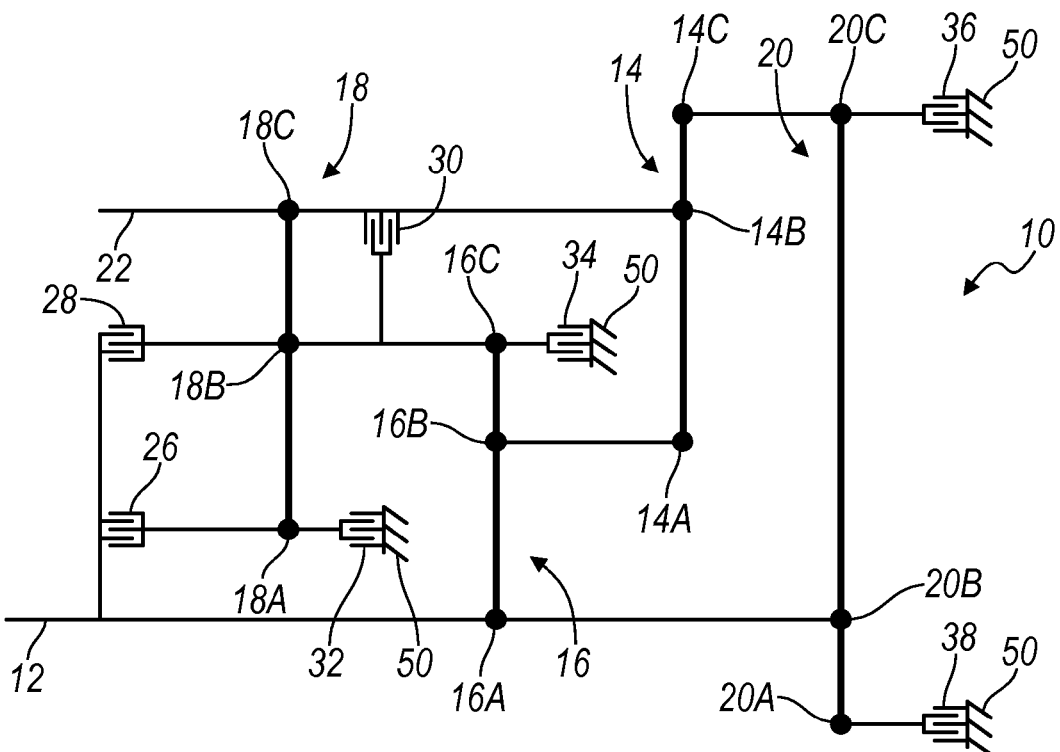
FIG. 1 is a lever diagram of an embodiment of a transmission according to the principles of present invention.

Referring now to FIG. 1, an embodiment of a twelve speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B, and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 16A of the second planetary gear set 16 and the second node 20B of the fourth planetary gear set 20. The output member 22 is continuously coupled to the third node 18C of the third planetary gear set 18 and the second node 14B of the first planetary gear set 14.

The first node 14A of the first planetary gear set 14 is coupled to the second node 16B of the second planetary gear set 16. The second node 14B of the first planetary gear set 14 is coupled to the third node 18C of the third planetary gear set 18. The third node 14C of the first planetary gear set 14 is coupled to the third node 20C of the fourth planetary gear set 20.

The first node 16A of the second planetary gear set 16 is coupled to the second node 20B of the fourth planetary gear set 20. The third node 16C of the second planetary gear set 16 is coupled to second node 18B of the third planetary gear set 18.

A first clutch 26 selectively connects the input member or shaft 12, the first node 16A of the second planetary gear set 16, and the second node 20B of the fourth planetary gear set 20 with the first node 18A of the third planetary gear set 18. A second clutch 28 selectively connects the input member or shaft 12, the first node 16A of the second planetary gear set 16, and the second node 20B of the fourth planetary gear set 20 with the second node 18B of the third planetary gear set 18 and the third node 16C of the second planetary gear set 16. A third clutch 30 selectively connects the output member or shaft 22, the third node 18C of the third planetary gear set 18, and the second node 14B of the first planetary gear set 14 with the third node 16C of the second planetary gear set 16 and the second node 18B of the third planetary gear set 18.

A first brake 32 selectively connects the first node 18A of the third planetary gear set 18 with a stationary member or transmission housing 50. A second brake 34 selectively connects the third node 16C of the second planetary gear set 16 and the second node 18B of the third planetary gear set 18 with the stationary member or transmission housing 50. A third brake 36 selectively connects the third node 14C of the first planetary gear set 14 and the third node 20C of the fourth planetary gear set 20 with the stationary member or transmission housing 50. A fourth brake 38 selectively connects the first node 20A of the fourth planetary gear set 20 with the stationary member or transmission housing 50.

Figure 2:
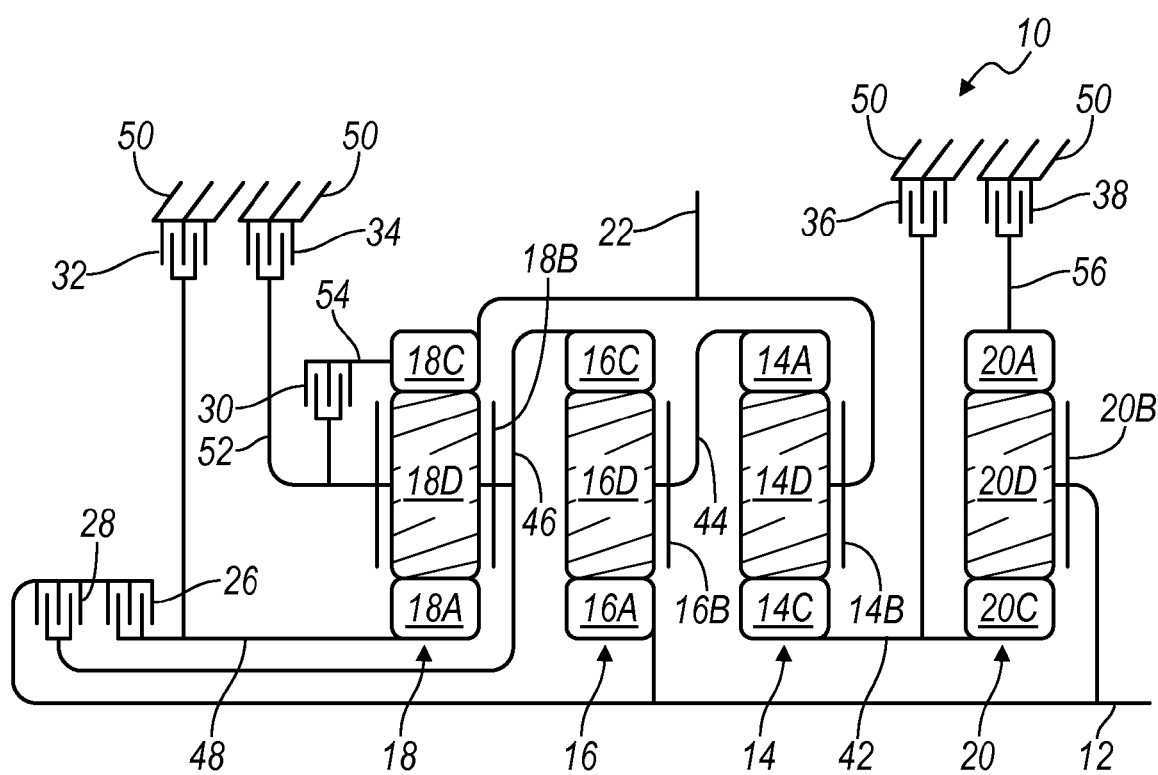
FIG. 2 is a diagrammatic illustration of one variation of the transmission of FIG. 1, according to the principles of the present invention.

Referring now to FIG. 2, a stick diagram presents a schematic layout of an embodiment of the twelve speed transmission 10 according to one form of the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 includes a first sun gear member 14C, a first ring gear member 14A, and a first planet gear carrier member 14B that rotatably supports a first set of planet gears 14D (only one of which is shown). The first planetary gear set 14 is a simple planetary gear set in this variation, but in other variations of the present invention, the first planetary gear set 14 could be a compound planetary gear set. The first sun gear member 14C is connected for common rotation with a first shaft or interconnecting member 42. The first ring gear member 14A is connected for common rotation with a second shaft or interconnecting member 44. The first planet carrier member 14B is connected for common rotation with the output shaft or member 22. The first planet gears 14D are each configured to intermesh with both the first sun gear member 14C and the first ring gear member 14A.

The second planetary gear set 16 includes a second sun gear member 16A, a second ring gear member 16C, and a second planet gear carrier member 16B that rotatably supports a second set of planetary gears 16D (only one of each is shown). The second planetary gear set 16 is a simple planetary gear set in this variation, but in other variations of the present invention, the second planetary gear set 16 could be a compound planetary gear set having more than one set of planetary gears supported by the carrier member 16B. The second sun gear member 16A is connected for common rotation with the input shaft or member 12. The second planet carrier member 16B is connected for common rotation with the second shaft or interconnecting member 44. The second ring gear member 16C is connected for common rotation with a third shaft or interconnecting member 46. The second set of planet gears 16D is configured to intermesh with both the second ring gear member 16C and the second sun gear member 16A.

The third planetary gear set 18 includes a third sun gear member 18A, a third ring gear member 18C, and a third planet gear carrier member 18B that rotatably supports a third set of planet gears 18D (only one of which is shown). In other words, the third planetary gear set 18 is a simple planetary gear set in this variation, but in other variations of the present invention, the third planetary gear set 18 could be a compound planetary gear set. The third sun gear member 18A is connected for common rotation with a fourth shaft or interconnecting member 48. The third planet carrier member 18B is connected for common rotation with the third shaft or interconnecting member 46 and a fifth shaft or interconnecting member 52. The third ring gear member 18C is connected for common rotation with the output shaft or member 22. In addition, the third ring gear member 18C is connected for common rotation with a sixth shaft or interconnecting member 54. The third planet gears 18D are each configured to intermesh with both the third sun gear member 18A and the third ring gear member 18C.

The fourth planetary gear set 20 includes a fourth sun gear member 20C, a fourth ring gear member 20A, and a fourth planet gear carrier member 20B that rotatably supports a fourth set of planet gears 20D (only one of which is shown). In other words, the fourth planetary gear set 20 is a simple planetary gear set in this variation, but in other variations of the present invention, the fourth planetary gear set 20 could be a compound planetary gear set. The fourth sun gear member 20C is connected for common rotation with the first shaft or interconnecting member 42. The fourth ring gear member 20A is connected for common rotation with a seventh shaft or interconnecting member 56. The fourth planetary gear carrier member 20B is connected for common rotation with the input shaft or member 12. The fourth planet gears 20D are each configured to intermesh with both the fourth sun gear member 20C and the fourth ring gear member 20A.

The input shaft or member 12 is continuously connected to an input source, such as an engine (not shown) or a turbine of a torque converter (not shown). The output shaft or member 22 is continuously connected with another output such as the final drive unit or transfer case (not shown).

The torque-transmitting mechanisms, including the first, second, and third clutches 26, 28, 30 and the first, second, third, and fourth brakes 32, 34, 36, 38 allow for selective interconnection of the shafts or interconnecting members 42, 44, 46, 48, 52, 54, 56 of the planetary gear sets 14A-C, 16A-C, 18A-C, 20A-C, and the housing 50.

For example, the first clutch 26 is selectively engageable to connect the input shaft or member 12 with the fourth shaft or interconnecting member 48. The second clutch 28 is selectively engageable to connect the input shaft or member 12 with the third shaft or interconnecting member 46. The third clutch 30 is selectively engageable to connect the fifth shaft or interconnecting member 52 with the sixth shaft or interconnecting member 54.

The first brake 32 is selectively engageable to connect the fourth shaft or interconnecting member 48 with the stationary element or the transmission housing 50 in order to restrict the member 48 from rotating relative to the transmission housing 50. The second brake 34 is selectively engageable to connect the fifth shaft or interconnecting member 52 with the stationary element or the transmission housing 50 in order to restrict the member 52 from rotating relative to the transmission housing 50. The third brake 36 is selectively engageable to connect the first shaft or interconnecting member 42 with the stationary element or the transmission housing 50 in order to restrict the member 42 from rotating relative to the transmission housing 50. The fourth brake 38 is selectively engageable to connect the seventh shaft or interconnecting member 56 with the stationary element or the transmission housing 50 in order to restrict the member 56 from rotating relative to the transmission housing 50. In turn, the gear elements connected to each of the connecting members are also connected or restricted accordingly.

Figures 3, 4:
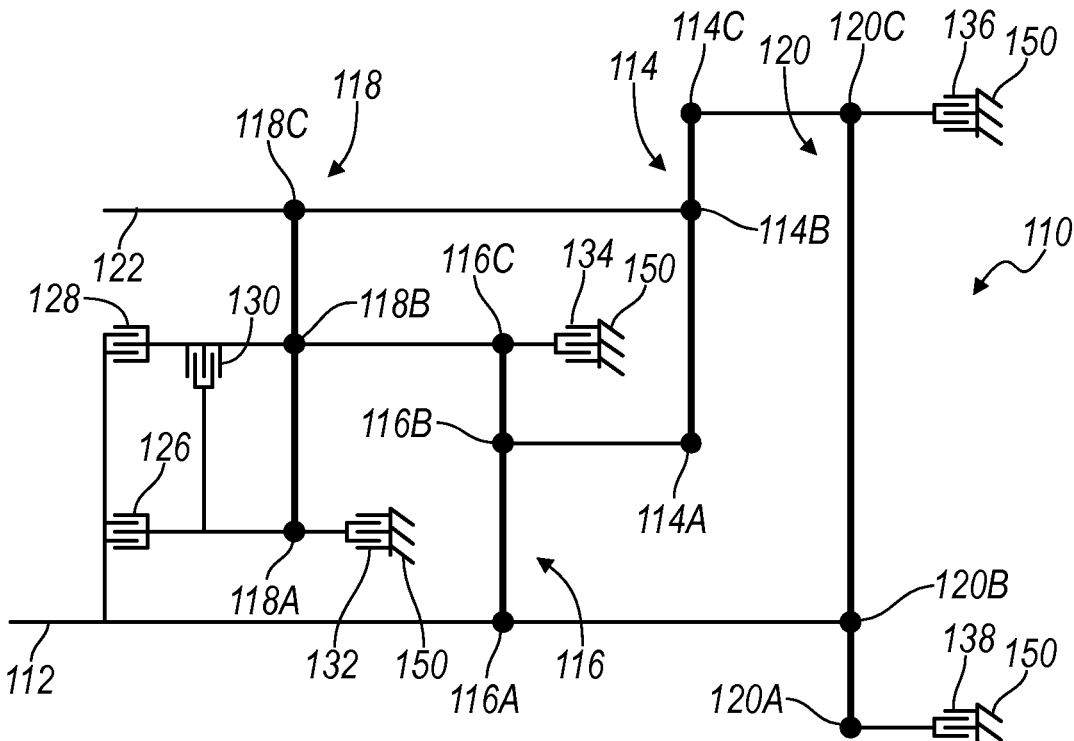
FIG. 3 is a truth table presenting an example of a state of engagement of various torque transmitting elements in forward and reverse speeds or gear ratios of the transmission illustrated in FIGS. 1-2.
FIG. 4 is a lever diagram of another embodiment of a transmission according to the principles of the present invention.

Referring now to FIG. 2 and FIG. 3, the operation of the embodiment of the transmission 10 will be described. It will be appreciated that transmission 10 is capable of transmitting torque from the input shaft or member 12 to the output shaft or member 22 in eleven, twelve, or more forward speed torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, second brake 34, third brake 36, and fourth brake 38), as will be explained below.

FIG. 3 is a truth table presenting the various combinations of torque-transmitting mechanisms that are activated or engaged to achieve the various gear states. An "X" in the box means that the particular clutch or brake is engaged to achieve the desired gear state. An "O" in the box means that a particular clutch or brake is engaged but not carrying torque (no "O's" are present in FIG. 3). Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, the first clutch 26 and the second brake 34 are engaged or activated. The first clutch 26 connects the input shaft or member 12 with the fourth shaft or interconnecting member 48. The second brake 34 connects the fifth shaft or interconnecting member 52 with the stationary element or the transmission housing 50 in order to restrict the member 52 from rotating relative to the transmission housing 50, which restricts the third planetary carrier member 18B and the second ring gear member 16C from rotating relative to the transmission housing 50. Likewise, twelve forward ratios are achieved through different combinations of clutch and brake engagement, as shown in FIG. 3, by way of example.

Referring now to FIG. 4, another embodiment of a twelve speed transmission 110 is illustrated in a lever diagram format. The transmission 110 includes an input shaft or member 112, a first planetary gear set 114, a second planetary gear set 116, a third planetary gear set 118, a fourth planetary gear set 120, and an output shaft or member 122. Like the lever diagram of FIG. 1, in the lever diagram of FIG. 4, each of the planetary gear sets 114, 116, 118, 120 have first, second, and third nodes 114A-C, 116A-C, 118A-C, 120A-C.

The input member 112 is continuously coupled to the first node 116A of the second planetary gear set 116 and the second node 120B of the fourth planetary gear set 120. The output member 122 is continuously coupled to the third node 118C of the third planetary gear set 118 and the second node 114B of the first planetary gear set 114. The first node 114A of the first planetary gear set 114 is coupled to the second node 116B of the second planetary gear set 116. The second node 114B of the first planetary gear set 114 is coupled to the third node 118C of the third planetary gear set 118. The third node 114C of the first planetary gear set 114 is coupled to the third node 120C of the fourth planetary gear set 120.

The first node 116A of the second planetary gear set 116 is coupled to the second node 120B of the fourth planetary gear set 120. The third node 116C of the second planetary gear set 116 is coupled to second node 118B of the third planetary gear set 118.

A first clutch 126 selectively connects the input member or shaft 112, the first node 116A of the second planetary gear set 116, and the second node 120B of the fourth planetary gear set 120 with the first node 118A of the third planetary gear set 118. A second clutch 128 selectively connects the input member or shaft 112, the first node 116A of the second planetary gear set 116, and the second node 120B of the fourth planetary gear set 120 with the second node 118B of the third planetary gear set 118 and the third node 116C of the second planetary gear set 116. A third clutch 130 selectively connects the first node 118A of the third planetary gear set 118 with the second node 118B of the third planetary gear set 118 and the third node 116C of the second planetary gear set 116.

A first brake 132 selectively connects the first node 118A of the third planetary gear set 118 with a stationary member or transmission housing 150. A second brake 134 selectively connects the third node 116C of the second planetary gear set 116 and the second node 118B of the third planetary gear set 118 with the stationary member or transmission housing 150. A third brake 136 selectively connects the third node 114C of the first planetary gear set 114 and the third node 120C of the fourth planetary gear set 120 with the stationary member or transmission housing 150. A fourth brake 138 selectively connects the first node 120A of the fourth planetary gear set 120 with the stationary member or transmission housing 150.

Figures 5, 6:
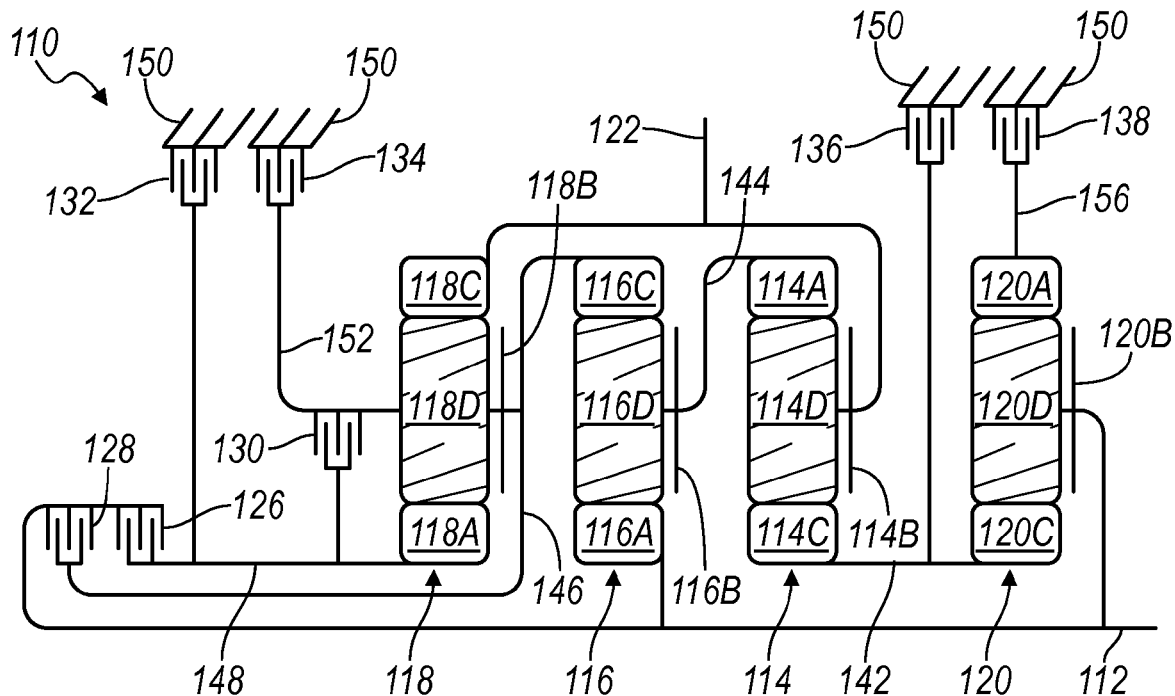
FIG. 5 is a diagrammatic illustration of one variation of the transmission of FIG. 4, according to the principles of the present invention.
FIG. 6 is a truth table presenting an example of a state of engagement of various torque transmitting elements in forward and reverse speeds or gear ratios of the transmission illustrated in FIGS. 4-5.

Referring now to FIG. 5, a stick diagram presents a schematic layout of an embodiment of the twelve speed transmission 110 of FIG. 4, according to one form of the present invention. It should be understood that alternatively, other different stick diagrams could be used in conjunction with the lever diagram FIG. 4. In FIG. 5, the numbering from the lever diagram of FIG. 4 is carried over. The clutches and couplings are correspondingly presented whereas the nodes of the planetary gear sets now appear as components of planetary gear sets such as sun gears, ring gears, planet gears and planet gear carriers.

For example, like the stick diagram in FIG. 2, the stick diagram in FIG. 5 includes a first, second, third, and fourth planetary gear sets 114, 116, 118, 120, wherein each includes a sun gear member 114C, 116A, 118A, 120C, a planet carrier member 114B, 116B, 118B, 120B having planet gears 114D, 116D, 118D, 120D, and a ring gear member 114A, 116C, 118C, 120A. The planet gears 114D, 116D, 118D, 120D intermesh with both a sun gear member 114C, 116A, 118A, 120C and a ring gear member 114A, 116C, 118C, 120A, respectively. Each of the planetary gear sets 114, 116, 118, 120 are simple planetary gear sets in this variation, but in other variations of the present invention, one or more of the planetary gear sets 114, 116, 118, 120 could be compound planetary gear sets. The input shaft or member 112 is continuously connected to an input source, and the output shaft or member 122 is continuously connected with another output.

The first sun gear member 114C is connected for common rotation with a first shaft or interconnecting member 142. The first ring gear member 114A is connected for common rotation with a second shaft or interconnecting member 144. The first planet carrier member 114B is connected for common rotation with the output shaft or member 122.

The second sun gear member 116A is connected for common rotation with the input shaft or member 112. The second planet carrier member 116B is connected for common rotation with the second shaft or interconnecting member 144. The second ring gear member 116C is connected for common rotation with a third shaft or interconnecting member 146.

The third sun gear member 118A is connected for common rotation with a fourth shaft or interconnecting member 148. The third ring gear member 118C is connected for common rotation with the output shaft or member 122. The third planet carrier member 118B is connected for common rotation with the third shaft or interconnecting member 146 and a fifth shaft or interconnecting member 152.

The fourth sun gear member 120C is connected for common rotation with the first shaft or interconnecting member 142. The fourth ring gear member 120A is connected for common rotation with a sixth shaft or interconnecting member 156. The fourth planetary gear carrier member 120B is connected for common rotation with the input shaft or member 112.

The torque-transmitting mechanisms, including the first, second, and third clutches 126, 128, 130 and the first, second, third, and fourth brakes 132, 134, 136, 138 allow for selective interconnection of the shafts or interconnecting members, members of the planetary gear sets and the housing. For example, the first clutch 126 is selectively engageable to connect the input shaft or member 112 with the fourth shaft or interconnecting member 148. The second clutch 128 is selectively engageable to connect the input shaft or member 112 with the third shaft or interconnecting member 146. The third clutch 130 is selectively engageable to connect the fifth shaft or interconnecting member 152 with the fourth shaft of interconnecting member 148.

The first brake 132 is selectively engageable to connect the fourth shaft or interconnecting member 148 with the stationary element or the transmission housing 150. The second brake 134 is selectively engageable to connect the fifth shaft or interconnecting member 152 with the stationary element or the transmission housing 150. The third brake 136 is selectively engageable to connect the first shaft or interconnecting member 142 with the stationary element or the transmission housing 150. The fourth brake 138 is selectively engageable to connect the sixth shaft or interconnecting member 156 with the stationary element or the transmission housing 150.

Referring now to FIGS. 5-6, the operation of the illustrated embodiment of the transmission 110 will be described. The transmission 110 is capable of transmitting torque from the input shaft or member 112 to the output shaft or member 122 in eleven, twelve, or more forward speed torque ratios and at least one reverse speed or torque ratio. Each forward and reverse speed or torque ratio is attained by engagement of one or more of the torque-transmitting mechanisms (i.e. first clutch 126, second clutch 128, third clutch 130, first brake 132, second brake 134, third brake 136, and fourth brake 138), as will be explained below.

Like FIG. 3, FIG. 6 is a truth table presenting the various combinations of torque-transmitting mechanisms that are activated or engaged to achieve the various gear states, except that FIG. 6 corresponds to the transmission 110 of FIGS. 4-5 instead of the transmission 10 of FIGS. 1-2. Actual numerical gear ratios of the various gear states are also presented although it should be appreciated that these numerical values are exemplary only and that they may be adjusted over significant ranges to accommodate various applications and operational criteria of the transmission 110. Of course, other gear ratios are achievable depending on the gear diameter, gear teeth count and gear configuration selected.

For example to establish a reverse gear, the first clutch 126 and the second brake 134 are engaged or activated. The first clutch 126 connects the input shaft or member 112 with the fourth shaft or interconnecting member 148. The second brake 134 connects the fifth shaft or interconnecting member 152 with the stationary element or the transmission housing 150 in order to restrict the member 152 from rotating relative to the transmission housing 150, which also restricts the third planetary carrier member 18B and the second ring gear member 16C from rotating relative to the transmission housing 150. Likewise, twelve forward ratios may be achieved through different combinations of clutch and brake engagement, as shown in FIG. 6.

It will be appreciated that the foregoing explanation of operation and gear states of the transmissions 10, 110 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 7A:
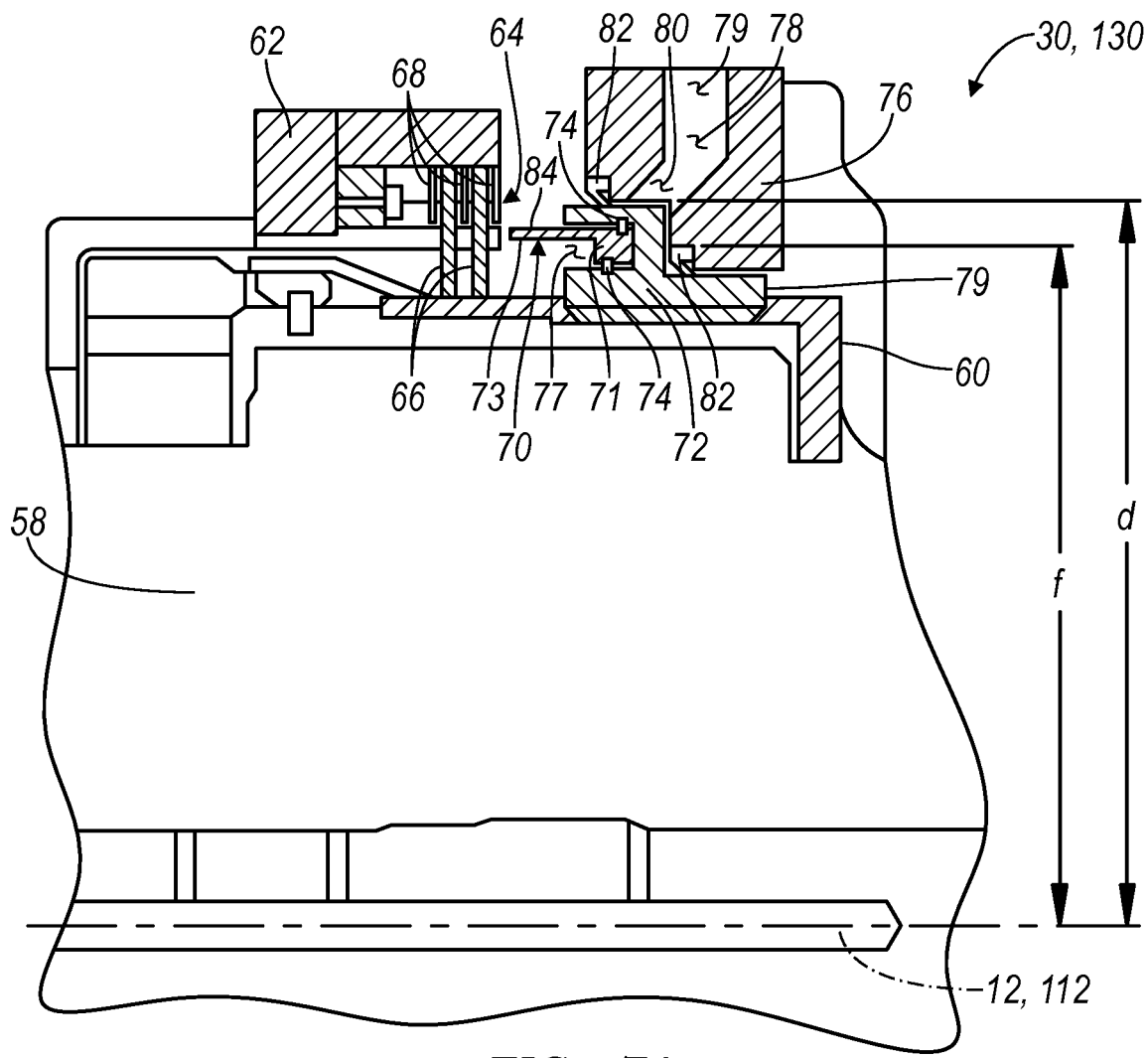
FIG. 7A is a cross-sectional side view of a clutch assembly in accordance with the principles of the present invention.

Referring now to FIG. 7A, the third clutch assembly 30, 130 will be described in more detail. FIG. 7A shows the third clutch assembly 30, 130 in a portion of one of the transmissions 10, 10', 110, 110', wherein the planetary gear sets 12, 112, 14, 114, 16, 116, 18, 118 are located in a central portion 58 of the transmission 10, 10', 110, 110' (but the planetary gear sets are not shown in FIG. 7A). The third clutch assembly 30, 130 is disposed in the powerflow of FIGS. 1, 2, 4, and 5, as explained above, but the third clutch assembly 30, 130 may alternatively be used as one of the first and second clutches 26, 126, 28, 128, or as a clutch in another transmission, without falling beyond the spirit and scope of the present disclosure.

The third clutch assembly 30, 130 (hereinafter, clutch assembly 30, 130) is operable to selectively connect two members together. In FIG. 7A, the clutch assembly 30, 130 is configured to selectively interconnect a first member 60 with a second member 62. In the third clutch 30 of FIGS. 1-2, the clutch assembly 30 selectively interconnects the second member 18B of the third planetary gear set 18 and the third member 16C of the second planetary gear set 16 (which are coupled to one of the first and second members 60, 62) with the third member 18C of the third planetary gear set 18, the second member 14B of the first planetary gear set 14, and the output member (which are coupled to the other of the first and second members 60, 62). In the third clutch 130 of FIGS. 4-5, the clutch assembly 130 selectively couples the second member 118B of the third planetary gear set 118 and the third member 116C of the second planetary gear set 116 (which are coupled to one of the first and second members 60, 62) with the first member 118A of the third planetary gear set 118A (which is coupled to the other of the first and second members 60, 62).

The clutch assembly 30, 130 includes a plurality or group of interleaved clutch plates 64 that is selectively engageable to interconnect the first member 60 with the second member 62. The plurality of interleaved clutch plates 64 includes one or more first clutch plates 66 that are attached to the first member 60; in this case, there are two first clutch plates 66 that are splined to the first member 60. The plurality of interleaved clutch plates 64 also includes one or more second clutch plates 68 that are attached to the second member 62; in this case, there are three second clutch plates 68 splined to the second member 62.

The clutch plates 66, 68 may be annular shaped friction plates, having friction material disposed on one or both sides of a core plate, and/or annular shaped separator plates, by way of example. The first and second clutch plates 66, 68 are arranged alternately with each other between the first and second members 60, 62. For example, the first clutch plates 66 are interleaved with the second clutch plates 68, so that each first clutch plate 66 is disposed adjacent to a second clutch plate 68.

When, the clutch assembly 30, 130 is engaged, a rotating apply piston 70 is operable to compress the plurality of interleaved clutch plates 64 together to couple the first and second members 60, 62 together. In other words, to engage the clutch assembly 30, 130, the apply piston 70 presses the first and second clutch plates 66, 68 against each other, and in some variations, the first and second clutch plates 66, 68 may be pressed against a reaction surface, such as a backing plate (not shown). When the clutch assembly 30, 130 is fully engaged, the first and second clutch plates 66, 68 rotate together and, therefore, the first and second members 60, 62 rotate together.

In the embodiment of FIG. 7A, a rotatable piston housing 72 surrounds, and is disposed around, a portion of the rotatable apply piston 70. The apply piston 70 and the piston housing 72 rotate together, along with the first member 60. The piston housing 72 is attached to the first member 60, for example, by splines. In other words, the apply piston 70 is connected for common rotation with the piston housing 72 and the first member 60. The apply piston 70 is configured to rotate during at least one output gear speed of the transmission 10, 10', 110, 110'. For example, if the piston 70 is coupled to the output member 22, 122, the piston 70 would rotate whenever the output member 22, 122 rotates, which occurs in all forward and reverse speeds, but not in neutral. If the piston 70 is coupled to one of the other interconnecting members 42, 44, 46, 48, 52, 56, 142, 144, 146, 148, 152, 156 that is not connected to the output member 22, 122, then the piston 70 would rotate whenever that interconnecting member rotates, which would be in one or more, but not all, of the transmission gear ratios.

The apply piston 70 has a generally cylindrical housing portion 71 located within the piston housing 72. The housing seals 74 surround the housing portion 71 of the apply piston 70. A cylindrical or other shaped rod 73 is attached to or formed unitarily with the housing portion 71 of the apply piston 70. The rod 73 physically contacts and compresses the plurality of clutch plates 64 when the clutch assembly 30, 130 is engaged and the apply piston 70 slides toward and into contact with the plurality of clutch plates 64. When the apply piston 70 is engaged, the housing portion 71 and housing seals 74 slide within the piston housing 72. A portion of the piston housing 72 has a generally annular shape, wherein the annulus is extruded to form a hollow cylinder having a cavity 77, in which the housing portion 71 of the apply piston 70 is disposed. Another portion of the piston housing 72 is a base part 79 that connects to the first member 60, for example, by a spline.

At least one housing seal 74 surrounds the apply piston 70 and is disposed between the apply piston 70 and the piston housing 72. The housing seal 74 contacts both the apply piston 70 and the piston housing 72, in this embodiment. The housing seal 74 aids in directing fluid to the desired parts of the clutch assembly 30, 130.

A stationary fluid supply member 76, which is connected to a stationary member such as the transmission housing, is provided to supply fluid to the clutch assembly 30, 130. The stationary fluid supply member 76 has portions forming a channel 78 in the stationary fluid supply member 76 and defining an outlet end 80 of the channel 78. The stationary fluid supply member 76 is configured to supply fluid to the apply piston 70 through the outlet end 80 of the channel 78. The fluid may be hydraulic, lubricating and/or cooling fluid, such as automatic transmission fluid.

At least one member seal 82 is disposed between the stationary fluid supply member 76 and the apply piston 70. In this embodiment, a pair of member seals 82 contacts the stationary fluid supply member 76 and the piston housing 72. Accordingly, the member seals 82 cooperate with the stationary fluid supply member 76, the piston housing 72, the apply piston 70, and the housing seals 74 to direct fluid to the desired locations within the clutch assembly 30, 130. For example, the fluid may flow through the piston housing 72 to the plurality of interleaved clutch plates 64, wherein the member seals 82 are configured to seal the fluid away from other surrounding parts of the transmission. The member seals 82 have a rotating interface with the stationary fluid supply member 76, because the member seals 82 rotate with the piston housing 72, but the stationary fluid supply member 76 remains stationary.

The portions forming the outlet end 80 of the fluid supply channel 78, and also the outlet end 80, are disposed radially outwardly from an outer side 84 of the apply piston 70. A portion of the outlet end 80 is also disposed radially outwardly of the piston housing 72, in this embodiment. Consequently, the fluid supply does not originate within the apply piston 70 diameter or from a central shaft 12, 112 of the transmission 10, 10', 110, 110'; instead the fluid is directed through the stationary fluid supply member 76 to the apply piston 70 from outside of the apply piston 70 diameter.

In the illustrated embodiment, the channel 78 formed through the stationary fluid supply member 76 begins with an inlet end 79, followed by a straight path, an approximately forty-five degree turn, another straight path, and then the outlet end 80. It should be understood, however, that any other desired fluid channel path could be used, such as an arcuate channel or a straight channel having no bends, by way of example.

The apply piston 70 is disposed a first distance f from the central input member 12, 112 of the transmission 10, 10', 110, 110'. The portions forming the outlet end 80, and the outlet end 80 itself, of the channel 78 of the stationary fluid supply member 76 are disposed a second distance d from the central transmission input member 12, 112. The second distance d is greater than the first distance f. In other words, the outlet end 80 of the channel 78 is located closer to an outside wall of the transmission than the apply piston 70. The apply piston 70 is located closer to the central transmission input 12, 112 than the outlet end 80 of the stationary fluid supply member 76.

Figure 7B:
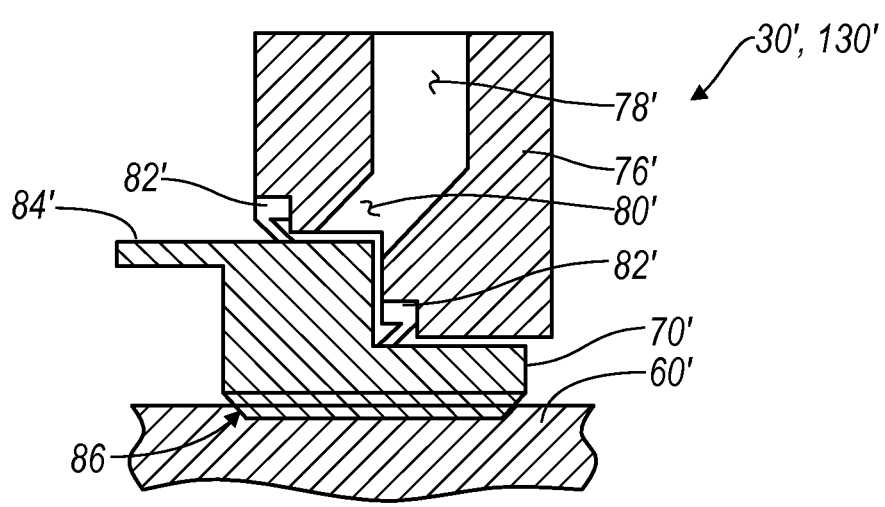
FIG. 7B is a cross-sectional side view of a portion of another clutch assembly, according to the principles of the present invention.

Referring now to FIG. 7B, another variation of the clutch assembly is illustrated and generally designated at 30', 130'. The FIG. 7B clutch assembly 30', 130' may also be used as the third clutch 30, 130 in the transmissions 10, 10', 110, 110' illustrated herein, or it may be used in any other transmission. For example, when used as the third clutch 30 of FIGS. 1-2, the clutch assembly 30', 130' selectively couples the second member 18B of the third planetary gear set 18 and the third member 16C of the second planetary gear set 16 (which are coupled to one of the first and second members 60, 62) with the third member 18C of the third planetary gear set 18, the second member 14B of the first planetary gear set 14, and the output member (which are coupled to the other of the first and second members 60, 62). When used as the third clutch 130 of FIGS. 4-5, the clutch assembly 30', 130' selectively couples the second member 118B of the third planetary gear set 118 and the third member 116C of the second planetary gear set 116 (which are coupled to one of the first and second members 60, 62) with the first member 118A of the third planetary gear set 118A (which is coupled to the other of the first and second members 60, 62).

The clutch assembly 30', 130' of FIG. 7B is the same as the clutch assembly 30, 130 of FIG. 7A, except that the clutch assembly 30', 130' of FIG. 7B omits the piston housing 72. Accordingly, only portions of the clutch assembly 30', 130' are illustrated in FIG. 7B, and any portions not shown are the same as those in FIG. 7A. For example, the clutch assembly 30', 130' is operable to selectively connect a first member 60' with a second member (not shown in FIG. 7B; see FIG. 7A), via a plurality of interleaved clutch plates (not shown in FIG. 7B; see FIG. 7A).

In the embodiment of FIG. 7B, no piston housing surrounds the rotatable apply piston 70'. The apply piston 70' rotates together with the first member 60, but the apply piston 70' may slide axially along the first member 60' via a sliding spline 86. Accordingly, the apply piston 70' and the first member 60' rotate together, but the apply piston 70' may move axially and linearly with respect to the first member 60' when the apply piston 70' is activated to engage the plurality of interleaved clutch plates. The apply piston 70' is configured to rotate during at least one output gear speed of the transmission.

A stationary fluid supply member 76' is provided that is the same as the stationary fluid supply member 76 in FIG. 7A.

Thus, the stationary fluid supply member 76' is connected to a stationary member such as the transmission housing and supplies fluid to the clutch assembly 30', 130'. The stationary fluid supply member 76' has portions forming a channel 78' in the stationary fluid supply member 76' and defining an outlet end 80' of the channel 78'. The stationary fluid supply member 76' is configured to supply fluid to the apply piston 70' through the outlet end 80' of the channel 78'. The fluid may be hydraulic, lubricating and/or cooling fluid, such as automatic transmission fluid.

At least one member seal 82' is disposed between the stationary fluid supply member 76' and the apply piston 70'. In this embodiment, a pair of member seals 82' contacts the stationary fluid supply member 76' and the apply piston 70'. The member seals 82' cooperate with the stationary fluid supply member 76' and the apply piston 70'. The member seals 82' may be used to direct fluid from the outlet 80' to the plurality of clutch plates 64', or the member seals 82' may be used to seal fluid within the cavity created between the apply piston 70', the member seals 82', and the stationary housing 76', by way of example. For example, in one variation, the member seals 82' could be used to direct fluid past the piston 70' to the plurality of interleaved clutch plates and to seal the fluid away from other surrounding parts of the transmission. The member seals 82' have a rotating interface with the stationary fluid supply member 76', because the member seals 82' rotate with the apply piston 70', but the stationary fluid supply member 76' is stationary.

The portions forming the outlet end 80', and also the outlet end 80', of the fluid supply channel 78' are disposed substantially radially outwardly from an outer side 84' of the apply piston 70'. The fluid supply does not originate within the apply piston 70' or even the central input member 12, 112; instead the fluid is directed through the stationary fluid supply member 76' to the apply piston 70' from outside of the apply piston 70' diameter.

Like the apply piston 70 of FIG. 7A, the apply piston 70' shown in FIG. 7B is disposed closer to the central transmission input member 12, 112 than the outlet 80' of the channel 78', as shown and described in FIG. 7A. The illustration and description of the distances d and f from FIG. 7A carries over to FIG. 7B and incorporated herein by reference, with the understanding that the distances apply equally when addressing FIG. 7B.

Using one of the clutch assemblies 30, 130, 30', 130' described herein allows fluid to be constantly applied to the clutch assemblies 30, 130, 30', 130' without regard to the speed of the node to which the clutch assembly is connected. In other words, the stationary fluid supply member 76, 76' may supply fluid to the clutch assembly 30, 130, 30', 130' at a constant rate, or at a rate that is unaffected by the speed of the node upon which the clutch assembly 30, 130, 30', 130' operates. For example, the clutch apply pressure may vary, but the clutch feed pressure may remain constant even though the clutch apply pressure varies, since it is being supplied through the stationary fluid supply member 76, 76' rather than through the apply piston 70, 70' or another clutch pressure feed line. Since the fluid is not supplied through a center axis of the clutch assembly 30, 130, 30', 130' or even the center of the transmission, balance fluid supplied through a balance dam is not required.

The speed of the apply piston 70, 70' may also remain constant through shifts if it is connected to the output node. For example, in FIGS. 1-2, the third clutch 30, including the apply piston 70, 70', may be attached to the output member 22, 122, such that it does not change speeds though shifts.

The description of the invention is merely exemplary in nature and variations that do not depart from the gist of the invention are intended to be within the scope of the invention. Such variations are not to be regarded as a departure from the spirit and scope of the invention.

What is claimed is:

1. A clutch assembly for use in an automatic transmission having a stationary member and an input member, the clutch assembly comprising:
   an apply piston configured to rotate during at least one output gear speed of the automatic transmission, the apply piston having a circumferential radial end disposed radially outward from the input member;
   a stationary fluid supply member attached to the stationary member and having portions forming a channel in the stationary fluid supply member and defining an outlet end of the channel, the stationary fluid supply member being configured to supply fluid to the apply piston through the outlet end of the channel; and
   at least one member seal contacting the stationary fluid supply member, the member seal being disposed between the stationary fluid supply member and the apply piston
   wherein the portions forming the outlet end of the channel of the stationary fluid member are at least partially disposed radially outward from the circumferential radial end of the apply piston.

2. The clutch assembly of claim 1, further comprising a central input member to the transmission, the apply piston being disposed a first distance from the central input member, and the portions forming the outlet end of the channel of the stationary fluid supply member being disposed a second distance from the central input member, the second distance being greater than the first distance.

3. The clutch assembly of claim 2, further comprising a plurality of interleaved clutch plates, the apply piston being configured to selectively compress the plurality of interleaved clutch plates to couple first and second parts together.

4. The clutch assembly of claim 1, further comprising a rotatable piston housing disposed around the apply piston, the rotatable piston housing and the apply piston configured to rotate together, wherein the member seal contacts the rotatable piston housing, the member seal having a rotating interface with the rotatable piston housing.

5. The assembly of claim 3, wherein the member seal contacts the apply piston, the member seal having a rotating interface with the apply piston, the apply piston having a sliding spline interface with the first part.

6. A transmission comprising:
   a stationary member;
   an input member;
   an output member;
   first, second, third, and fourth planetary gear sets each having first, second, and third members;
   a first interconnecting member continuously interconnecting the third member of the first planetary gear set with the third member of the fourth planetary gear set;
   a second interconnecting member continuously interconnecting the second member of the first planetary gear set with the third member of the third planetary gear set;
   a third interconnecting member continuously interconnecting the first member of the first planetary gear set with the second member of the second planetary gear set;

a fourth interconnecting member continuously interconnecting the third member of the second planetary gear set with the second member of the third planetary gear set;

a fifth interconnecting member continuously interconnecting the first member of the second planetary gear set with the second member of the fourth planetary gear set; and seven torque transmitting mechanisms each selectively engageable to interconnect at least one of the first, second, and third members with at least one other of the first, second, third members and a stationary transmission member, and wherein the seven torque transmitting mechanisms are selectively engageable in combinations of at least two to establish a plurality of forward speed ratios and at least one reverse speed ratio between the input member and the output member, a first torque transmitting mechanism of the plurality of torque transmitting mechanisms comprising an apply piston configured to rotate during at least one output gear speed of the automatic transmission, the apply piston having a circumferential radial end disposed radially outward from the input member, the first torque transmitting mechanism further comprising a stationary fluid supply member attached to the stationary member and having portions forming a channel in the stationary fluid supply member and defining an outlet end of the channel, the stationary fluid supply member being configured to supply fluid to the apply piston through the outlet end of the channel wherein the portions forming the outlet end of the channel of the stationary fluid member are at least partially disposed radially outward from the circumferential radial end of the apply piston.

7. The transmission of claim 6, wherein a second of the seven torque transmitting mechanisms is selectively engageable to interconnect the first member of the third planetary gear set with the input member, the second member of the fourth planetary gear set, and the first member of the second planetary gear set; wherein a third of the seven torque transmitting mechanisms is selectively engageable to interconnect the third member of the second planetary gear set and the second member of the third planetary gear set with the input member, the second member of the fourth planetary gear set, and the first member of the second planetary gear set; wherein a fourth of the seven torque transmitting mechanisms is selectively engageable to interconnect the first member of the third planetary gear set with the stationary transmission member; wherein a fifth of the seven torque transmitting mechanisms is selectively engageable to interconnect the second member of the third planetary gear set and the third member of the second planetary gear set with the stationary transmission member; wherein a sixth of the seven torque transmitting mechanisms is selectively engageable to interconnect the third member of the first planetary gear set and the third member of the fourth planetary gear set with the stationary transmission member; wherein a seventh of the seven torque transmitting mechanisms is selectively engageable to interconnect the first member of the fourth planetary gear set with the stationary transmission member; and wherein the output member is continuously connected for common rotation with the second member of the first planetary gear set and the third member of the third planetary gear set.

8. The transmission of claim 7, wherein the first torque transmitting mechanism is selectively engageable to interconnect the third member of the third planetary gear set and the second member of the first planetary gear set with the second member of the third planetary gear set and the third member of the second planetary gear set.

9. The transmission of claim 8, wherein the first torque transmitting mechanism comprises at least one member seal contacting the stationary fluid supply member, the member seal being disposed between the stationary fluid supply member and the apply piston.

10. The transmission of claim 8, wherein the input member is located along a central axis of the transmission, the apply piston of the first torque transmitting mechanism being disposed a first distance from the input member, and the portions forming the outlet end of the channel of the stationary fluid supply member of the first torque transmitting mechanism being disposed a second distance from the input member, the second distance being greater than the first distance.

11. The clutch assembly of claim 10, the first torque transmitting mechanism comprising a rotatable piston housing, the rotatable piston housing being disposed around the apply piston, wherein the member seal contacts the rotatable piston housing, the apply piston configured to rotate with the rotatable piston housing, the member seal having a rotating interface with the rotatable piston housing.

12. The assembly of claim 10, wherein the member seal of the first torque transmitting mechanism contacts the apply piston of the first torque transmitting mechanism, the member seal having a rotating interface with the apply piston.

13. The transmission of claim 10, wherein the third member of the first planetary gear set, the third member of the fourth planetary gear set, the first member of the second planetary gear set, and the first member of the third planetary gear set are sun gear members; wherein the second members of the first, second, third, and fourth planetary gear sets are planetary gear carrier members; and wherein the first member of the first planetary gear set, the first member of the fourth planetary gear set, the third member of the second planetary gear set, and the third member of the third planetary gear set are ring gear members.

14. The transmission of claim 8, wherein the first torque transmitting mechanism is selectively engageable to interconnect the first member of the third planetary gear set with the second member of the third planetary gear set and the third member of the second planetary gear set.

15. The transmission of claim 14, wherein the portions forming the outlet end of the channel of the stationary fluid supply member of the first torque transmitting mechanism are at least partially disposed radially outwardly from an outer side of the apply piston.

16. The transmission of claim 15, wherein the input member is located along a central axis of the transmission, the apply piston of the first torque transmitting mechanism being disposed a first distance from the input member, and portions forming the outlet end of the channel of the stationary fluid supply member of the first torque transmitting mechanism being disposed a second distance from the input member, the second distance being greater than the first distance.

17. The transmission of claim 16, wherein the third member of the first planetary gear set, the third member of the fourth planetary gear set, the first member of the second planetary gear set, and the first member of the third planetary gear set are sun gear members; wherein the second members of the first, second, third, and fourth planetary gear sets are planetary gear carrier members; and wherein the first member of the first planetary gear set, the first member of the fourth planetary gear set, the third member of the second planetary gear set, and the third member of the third planetary gear set are ring gear members.

18. A clutch assembly for use in an automatic transmission having a stationary member and an input member, the clutch assembly comprising:
- an apply piston having an outer side disposed radially outward from the input member, the apply piston configured to rotate during at least one output gear speed of the automatic transmission;
- a stationary fluid supply member attached to the stationary member and having portions forming a channel in the stationary fluid supply member and defining an outlet end of the channel, the stationary fluid supply member being configured to supply fluid to the apply piston through the outlet end of the channel, the portions forming the outlet end of the channel being at least partially disposed radially outwardly from the outer side of the apply piston; and
- at least one member seal contacting the stationary fluid supply member, the member seal being disposed between the stationary fluid supply member and the apply piston
- wherein the portions forming the outlet end of the channel of the stationary fluid member are at least partially disposed radially outward from the outer side of the apply piston.

* * * * *